United States Patent [19]

Bich et al.

[11] Patent Number: 5,052,171
[45] Date of Patent: Oct. 1, 1991

[54] PICKUP TINE GUARD MOUNTING ARRANGEMENT

[75] Inventors: Gary L. Bich, New Holland, Pa.; Wilfried J. Boucquez, Zedelgem, Belgium; Louis R. Thomas, New Holland, Pa.

[73] Assignee: Ford New Holland, Inc., New Holland, Pa.

[21] Appl. No.: 574,024

[22] Filed: Aug. 29, 1990

[51] Int. Cl.5 ........................................... A01D 57/03
[52] U.S. Cl. .................................. 56/364; 56/DIG. 9
[58] Field of Search ................. 56/364, 130, 294, 371, 56/DIG. 9, DIG. 20, DIG. 24

[56] References Cited

U.S. PATENT DOCUMENTS

| | | | |
|---|---|---|---|
| 2,524,233 | 10/1950 | Russell | 56/364 |
| 2,527,887 | 10/1950 | Martin | 56/364 |
| 3,226,921 | 1/1966 | Shepley | 56/364 |
| 3,295,302 | 1/1967 | Lee | 56/364 |
| 3,397,527 | 8/1968 | Luek et al. | 56/364 |
| 3,613,345 | 10/1971 | Cofer | 56/364 |
| 3,713,283 | 1/1973 | Fritz | 56/364 |
| 4,161,859 | 7/1979 | Storm et al. | 56/364 |

Primary Examiner—Terry L. Melius
Attorney, Agent, or Firm—Darrell F. Marquette; Frank A. Seemar; Larry W. Miller

[57] ABSTRACT

An arrangement for mounting tine guards on a pickup of an agricultural machine such as a baler or a forage harvester comprises upper and lower mounting plates which are removably attached to upper and lower frame members, respectively, on the pickup. The pickup includes a reel having a plurality of tines which project, as the reel rotates, through spaces or gaps formed between the tine guards. The upper ends of the tine guards are secured to the upper mounting plate while the lower ends of the tine guards are secured to the lower mounting plate so that the tine guards are removed together with the mounting plates when the mounting plates are detached from the pickup frame members.

10 Claims, 2 Drawing Sheets

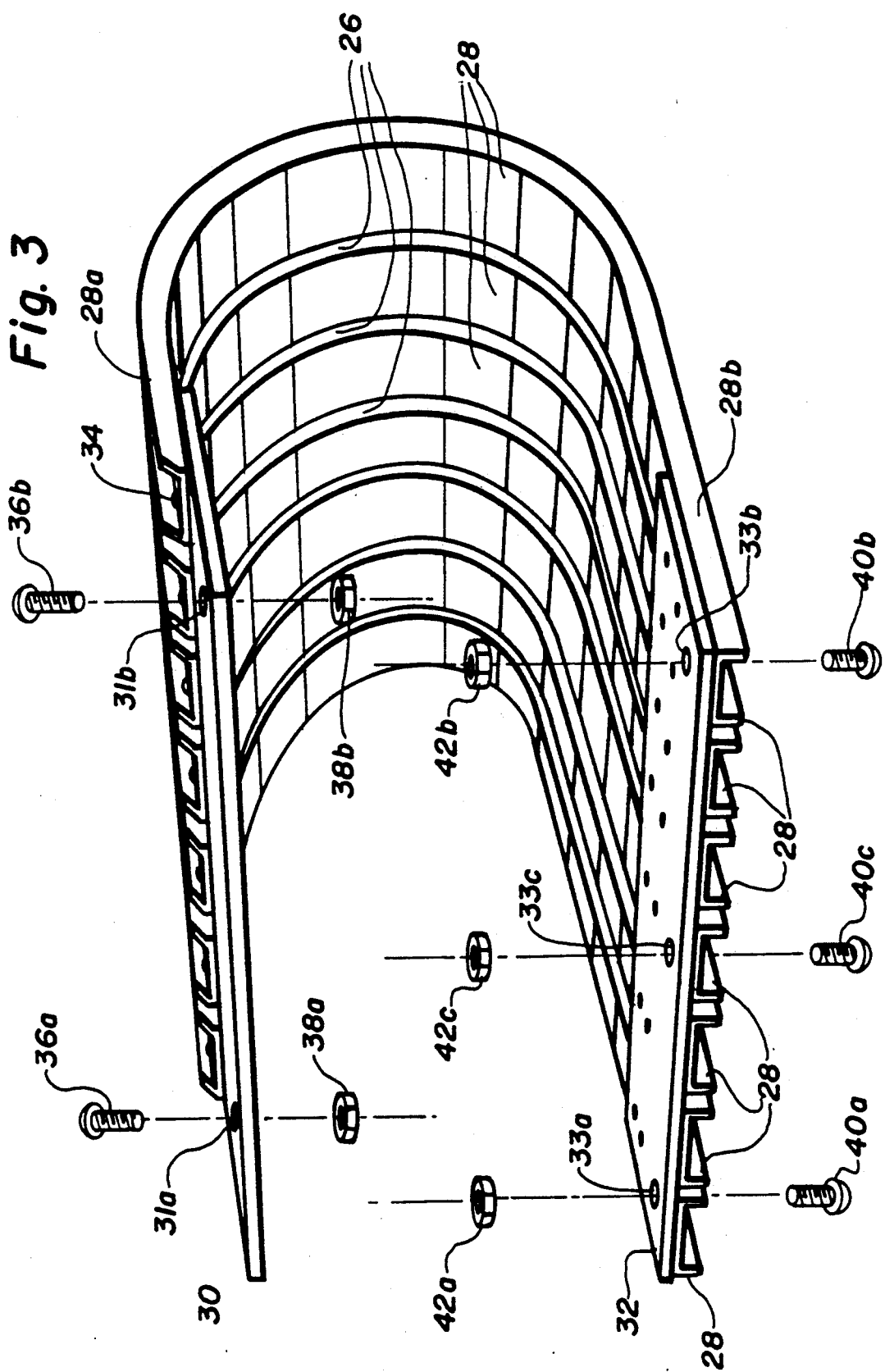

PICKUP TINE GUARD MOUNTING ARRANGEMENT

BACKGROUND OF THE INVENTION

This invention relates generally to pickups for agricultural machines and, in particular, to an arrangement for mounting pickup tine guards.

Pickups used on agricultural machines such as balers and forage harvesters typically include a reel which is rotatable about a horizontal axis. The reel has a plurality of tines mounted on bars for movement in a generally circular path to lift crop material from the ground. The tine bars are connected to a central shaft by end plates, and as the reel rotates, the tines project through spaces or gaps formed between tine guards arranged side-by-side transversely of the reel. These tine guards are individually secured by bolts at their top and bottom ends to support members on the pickup. U.S. Pat. No. 3,397,527 granted Aug. 20, 1968 to O. W. Luek et al. discloses a conventional mounting arrangement for tine guards wherein each guard is secured by four bolts or rivets at its top and bottom ends.

When service work on a pickup is necessary, one or more tine guards are removed in order to gain access to the reel. This is a time consuming job on conventional pickups because, in most situations, several (i.e. five to ten) tine guards must be removed to provide enough space to perform the service work. For example, if seven tine guards are removed from the pickup shown in the above-mentioned Luek et al. patent, the removal of twenty-eight bolts or rivets is also required.

SUMMARY OF THE INVENTION

The present invention provides an arrangement for mounting a plurality of tine guards on a pickup of an agricultural machine wherein the pickup includes a reel having a plurality of tines movable in a predetermined path to lift crop material from the ground. The tine guards are arranged side-by-side transversely of the reel and define spaces or gaps therebetween through which the tines project during movement in their predetermined path. The mounting arrangement for the tine guards comprises an upper mounting plate removably attached to first frame means on the pickup, and a lower mounting plate removably attached to second frame means on the pickup. The tine guards are secured to the upper and lower mounting plates for removal from the pickup together with the upper and lower mounting plates when the upper and lower mounting plates are detached from the first and second frame means.

In the preferred embodiment of the invention, a first set of fastening means removably attaches the upper mounting plate to the first frame means while a second set of fastening means removably attaches the lower mounting plate to the second frame means. The first set of fastening means comprises a fastener located adjacent one end of the upper mounting plate, and another fastener located adjacent the other end of the upper mounting plate. The second set of fastening means comprises a fastener located adjacent one end of the lower mounting plate, another fastener located adjacent the other end of the lower mounting plate, and a further fastener located intermediate the ends of the lower mounting plate.

DESCRIPTION OF THE DRAWINGS

FIG. 3 is a rear perspective view of a pickup tine guard mounting arrangement according to the preferred embodiment of the present invention.

DESCRIPTION OF THE PREFERRED EMBODIMENT

Figure 1:
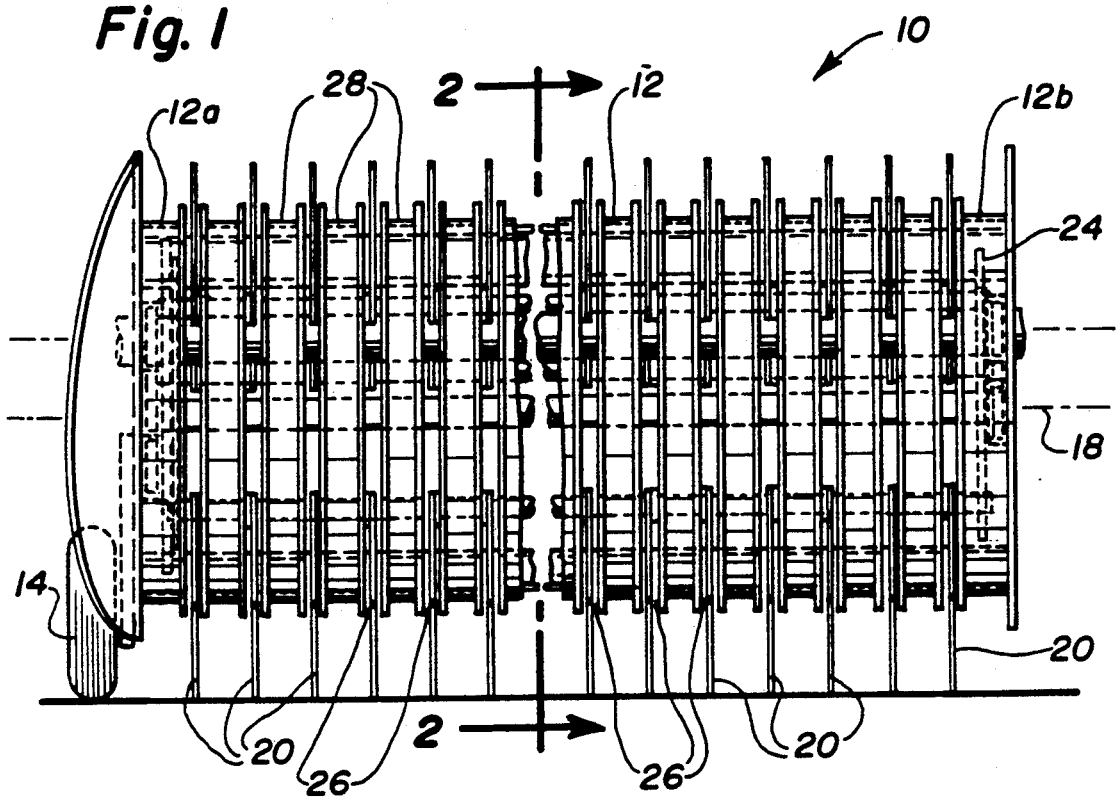
FIG. 1 is a front elevational view of a pickup for agricultural machines, with a center portion thereof broken away, incorporating a tine guard mounting arrangement according to the preferred embodiment of the present invention.
Figure 2:
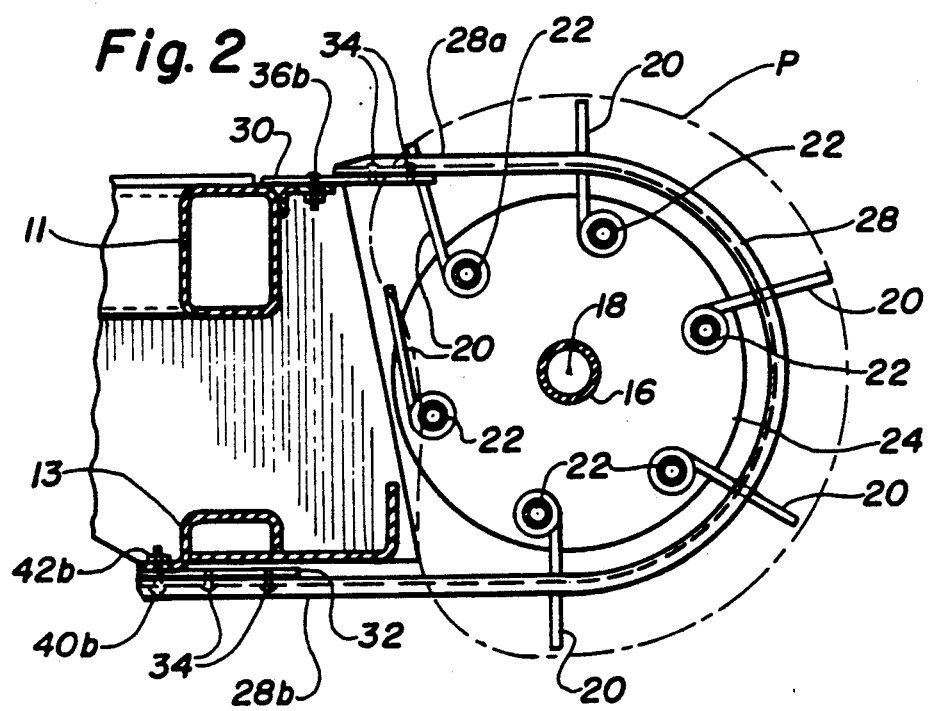
FIG. 2 is an enlarged sectional view taken along lines 2—2 in FIG. 1.

Referring to FIGS. 1 and 2, a pickup 10 for agricultural machines such as balers and forage harvesters includes a reel 12 supported at one end 12a by a wheel 14. The other end 12b of the reel 12 is supported by a frame (not shown) of a machine on which the pickup 10 is mounted. The reel 12 has a central shaft 16 with a horizontal axis 18, and a plurality of tines 20 are arranged in spaced apart rows along the length of the central shaft 16. The tines 20 are mounted on bars 22 which extend between plates 24 fixed to the shaft 16 adjacent the ends thereof. Conventional drive means such as chains and sprockets are provided to rotate the central shaft 16 and thereby cause movement of the tines 20 in a predetermined path P in order to lift crop material from the ground.

As the tines 20 move in the path P, they project through spaces of gaps 26 formed between a plurality of tine guards 28 which are arranged side-by-side transversely of the reel 12. The tine guards 28 are substantially C-shaped in side elevation and channel-shaped in cross section with their upper and lower ends 28a, 28b secured to upper and lower mounting plates 30, 32 by bolts or rivets 34. Although in the preferred embodiment shown in FIG. 3 the tine guards 28 are attached to the mounting plates 30, 32 in groups of seven, it will be understood that the number of tine guards 28 secured to the mounting plates 30, 32 may be increased or decreased as desired.

The upper mounting plate 30 is removably attached to an upper frame member 11 of the pickup 10 above and rearwardly of the central shaft 16 by a first set of fasteners or bolts 36a, 36b which extend downwardly through holes 31a, 31b in the plate 30 and are threaded into nuts 38a, 38b. Bolt 36a is located adjacent one end of the upper mounting plate 30, and bolt 36b is located adjacent the other end of the upper mounting plate 30. The lower mounting plate 32 is removably attached to a lower frame member 13 of the pickup 10 below and rearwardly of the central shaft 16 by a second set of fasteners or bolts 40a, 40b, 40c which extend upwardly through holes 33a, 33b, 33c in the plate 32 and are threaded into nuts 42a, 42b, 42c. Bolt 40a is located adjacent one end of the lower mounting plate 32, bolt 40b is located adjacent the other end of the lower mounting plate 32, and bolt 40c is located intermediate the ends of the lower mounting plate 32.

Therefore, it will be understood that the tine guards 28 are removed together with the upper and lower mounting plates 30, 32 when the mounting plates 30, 32 are detached from the frame members 11, 13. In the preferred embodiment of the present invention, a total of seven tine guards may be removed by removing only five bolts, whereas in prior arrangements such as disclosed in the aforementioned Luek et al patent, the removal of seven tine guards would require the removal of twenty-eight bolts. This is an important advantage of the present invention because it significantly reduces the amount of time required for removing and replacing tine guards.

It will be understood that since the pickup 10 shown in FIGS. 1 and 2 has more than seven tine guards, more than one of the tine guard mounting arrangements shown in FIG. 3 would be used. For example, if pickup 10 has fourteen tine guards, two of the mounting arrangements would be required.

What is claimed is:

1. In combination with a pickup for an agricultural machine wherein the pickup includes a reel having a plurality of tines movable in a predetermined path to lift crop material from the ground, a plurality of tine guards arranged side-by-side transversely of the reel and defining spaces or gaps therebetween through which said tines project during movement in said path, an arrangement for mounting said tine guards comprising:
   an upper mounting plate removable attached to first frame means on said pickup;
   a lower mounting plate removably attached to second frame means on said pickup; and
   said tine guards each being releasable fastened to said upper and lower mounting plates so that each of said tine guards may be separated individually from said upper and lower mounting plates, said tine guards being removed from said pickup together with said upper and lower mounting plates when said upper and lower mounting plates are detached from said first and second frame means.

2. The mounting arrangement of claim 1, wherein said tine guards each have an upper end releasably fastened to said upper mounting plate and a lower end releasably fastened to said lower mounting plate.

3. The mounting arrangement of claim 2, wherein said tine guards are substantially C-shaped in side elevation.

4. The mounting arrangement of claim 1, further comprising:
   a first set of fastening means for removably attaching said upper mounting plate to said first frame means; and
   a second set of fastening means for removably attaching said lower mounting plate to said second frame means.

5. The mounting arrangement of claim 4, wherein said first set of fastening means comprises a fastener located adjacent one end of said upper mounting plate, and another fastener located adjacent the other end of said upper mounting plate.

6. The mounting arrangement of claim 4, wherein said second set of fastening means comprises a fastener located adjacent one end of said lower mounting plate, another fastener located adjacent the other end of said lower mounting plate, and a further fastener located intermediate the ends of said lower mounting plate.

7. The mounting arrangement of claim 5, wherein said first set of fastening means comprises two bolts extendable downwardly through holes formed in said upper mounting plate.

8. The mounting arrangement of claim 6, wherein said second set of fastening means comprises three bolts extendable upwardly through holes formed in said lower mounting plate.

9. A pickup for an agricultural machine comprising:
   a reel having a plurality of tines movable in a predetermined path to lift crop material from the ground;
   a plurality of tine guards arranged side-by-side transversely of the reel and defining spaces or gaps through which said tines project during movement in said path;
   an upper mounting plate removably attached to first frame means on said pickup;
   a lower mounting plate removably attached to second frame means on said pickup; and
   said tine guards each being releasably fastened to said upper and lower mounting plates so that each of said tine guards may be separated individually from said upper and lower mounting plates, said tine guards being removed together with said upper and lower mounting plates when said upper and lower mounting plates are detached from said first and second frame means.

10. The pickup of claim 9, wherein said tine guards each have an upper end releasably fastened to said upper mounting plate and a lower end releasably fastened to said lower mounting plate.

* * * * *